United States Patent
Mendlovic et al.

[11] Patent Number: 6,041,151
[45] Date of Patent: Mar. 21, 2000

[54] ALL OPTICAL SWITCH

[75] Inventors: David Mendlovic, Petach Tikva; Dan M. Marom, Tel Aviv, both of Israel

[73] Assignee: Ramot University Authority for Applied Research & Industrial Development Ltd., Tel Aviv, Israel

[21] Appl. No.: 09/011,706
[22] PCT Filed: Aug. 12, 1996
[86] PCT No.: PCT/IL96/00079
  § 371 Date: Feb. 17, 1998
  § 102(e) Date: Feb. 17, 1998
[87] PCT Pub. No.: WO97/09536
  PCT Pub. Date: Mar. 13, 1997

[30] Foreign Application Priority Data
Aug. 25, 1995 [IL] Israel .................................. 115075

[51] Int. Cl.$^7$ .................................. G02B 6/26
[52] U.S. Cl. .................. 385/16; 359/252; 359/253
[58] Field of Search .................... 349/1, 196, 197; 359/489, 490, 494, 495, 497, 117, 122, 156, 252, 253; 385/16

[56] References Cited

U.S. PATENT DOCUMENTS

| | | | |
|---|---|---|---|
| 4,461,543 | 7/1984 | Mcmahon | 350/383 |
| 4,516,837 | 5/1985 | Soref et al. | 350/347 |
| 5,390,178 | 2/1995 | Hunter | 370/370 |
| 5,414,540 | 5/1995 | Patel et al. | 359/39 |
| 5,414,541 | 5/1995 | Patel et al. | 359/39 |
| 5,604,734 | 2/1997 | Buhrgard | 370/388 |

FOREIGN PATENT DOCUMENTS 2076994  6/1981  United Kingdom.

OTHER PUBLICATIONS

Neff, J.A., "Faster, Smaller Computers Will Rely on Photonics", *Photonics Spectra*, p. 107, Jan. 1995.

Govindarajan et al, "Optically Powered Optoelectronic Switch with Polarization Routing", *Photonics Tech. Letters*, 3(7):669–671, 1991.

Cheng et al, "Three–dimensional Omega Networks for Optical Implementation", *Applied Optics*, 31(26): 5468–5479, 1992.

Johnson et al, "Optical Interconnection Network Using Plarization–based Ferroelectric Liquid Crystal Gates", *Applied Optics*, 27(9): 1727–1733, 1988.

Krishnamoorthy et al, "Grain–size Consideration for Optoelectronic Multistage Interconnection Networks" *Applied Optics*, 31(26): 5480–5507, 1992.

Cloonan et al, "Shuffle–equivalent Interconnection Topologies Based on Computer–generated Bibary–phase Gratings", *Applied Optics*, 33(8): 1405–1430, 1994.

*Primary Examiner*—Hung N. Ngo
*Attorney, Agent, or Firm*—Mark M. Friedman

[57] ABSTRACT

An optical switch for switching first and second input beams linearly polarized in the same direction which has a first half wave plate for rotating the polarization optically coupled to the second input beam, the first input beam and the output of the half wave plate input to a first polarization beam displacer which provides a combined beam, the output of which is connected to a controllable half wave gate which in a passive state passes the combined beam gate and in the active state passes the combined beamed rotated by 90 degree to an output Gate in dependence of a controlled signal input to the controllable wave gate. The output of the controllable wave gate is input to a second polarization beam displacer which refracts light into first and second refracted output beams displaced from each other a predetermined distance and a second half wave plate.

13 Claims, 5 Drawing Sheets

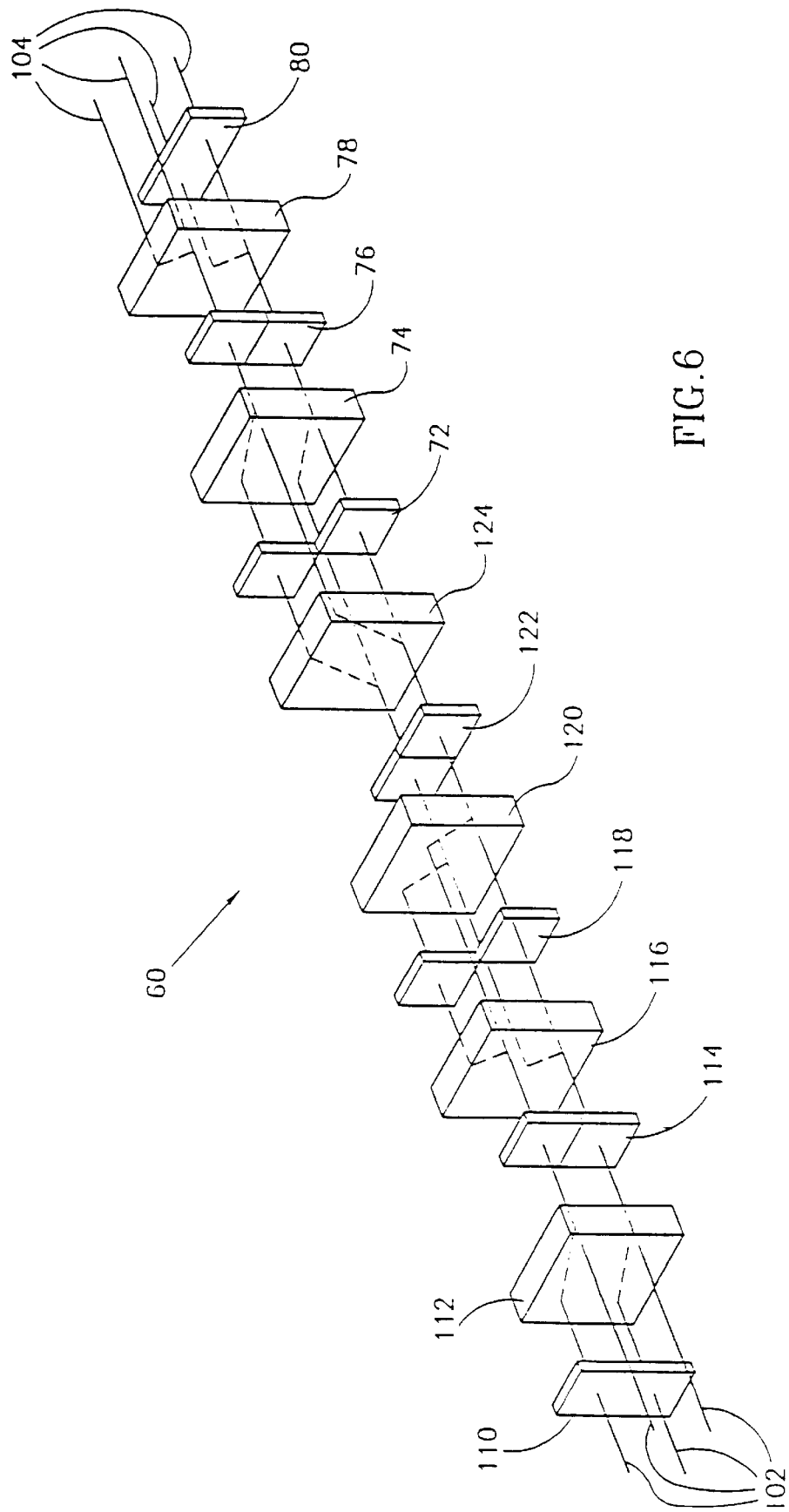

ALL OPTICAL SWITCH

FIELD AND BACKGROUND OF THE INVENTION

The combination of decreasing feature sizes and increasing chip sizes is leading to a communication crisis in the area of VLSI circuits and systems. It is generally realized that the exponential growth of semiconductor chip capabilities cannot continue indefinitely, and that fundamental limits exist. These limits arise not from difficulties associated with the reduction of gate areas and delays, but rather from the difficulties associated with the interconnections as dimensions are scaled downward and chip areas continue to increase. It is anticipated that the speeds of semiconductor circuits will soon be limited by the interconnection delays, rather than gate delays. Furthermore, the trend of increasing bit-rate introduces problems in conductor design, as the conductors must be treated as transmission lines for high frequencies. This problem has been designated as the communication bottleneck, and is affecting wide-bandwidth switching systems and high-throughput computer system architectures.

Improvements in manufacturing processes and material handling have allowed a constant reduction of feature sizes in integrated circuits. Additionally the number of transistors in application designs has increased steadily. As further chip integration and complexity is obtained, the chip I/O demand increases. Such high I/O densities become difficult with current bonding techniques such as solder bump bonding.

As the number of components and connections of systems increase, the difficulty in assembling and maintaining these systems increases too. Systems become impractical or excessively expensive to build. One problem encountered is the bandwidth required to move data between subsystems. Sufficient bandwidth cannot be supported by state of the art interconnection technology. One example is the lack of sufficient bandwidth on backplanes to support large broadband switching systems. One approach is to demultiplex high bandwidth signals to multiple lower bandwidth signals. However, if connections are to be maintained at their original rate, the designer is faced with maintaining the transmission line integrity from printed circuit board to printed circuit board. This is normally achieved by designing a backplane, circuit cards and connectors that are transmission lines. However, there is a limit to the number of connections that can be made this may.

Another disadvantage of electrical interconnection technology is excessive crosstalk. Any current flowing in a conductor induces a magnetic field. The result of this magnetic field is inductive coupling, and electrons in adjacent conductors will travel with this field and set currents circulating in the conductors. Capacitive coupling between striplines also causes crosstalk. To alleviate this problem, the electrical interconnection must be set at a distance large enough to prevent this signal from having any effect on system performance. This creates fundamental rules for circuit routing. Furthermore, electrical interconnect paths must reside near a ground plane to ensure that stray electric fields are properly terminated.

Electrical interconnections suffer from an additional problem of sensitivity to external electromagnetic interference. The fields that reside in the vicinity of the interconnection lines induce currents in them, causing erroneous signals in the lesser case to circuit damage in the worst case. Designers must shield integrated circuits by using conducting envelopes to prevent any field from entering the shielded volume. Special interconnection line design is required for lines that connect any shielded circuits. Shielding also worsens the problem of heat removal in the circuit, as ventilation is restricted.

Optical interconnections, rather than electrical, offer a solution to the problems plaguing conventional electrical interconnections. For example, optical interconnections offer a freedom from mutual coupling effects (i.e., cross talk) not afforded by conventional electronic interconnects. In addition, they offer increased bandwidths and immunity to electro-magnetic interference. This potential advantage of optics becomes more important as the bit rate increases, as the strength of mutual coupling associated with electrical interconnects is proportional to the frequency of the signals propagating on the interconnect lines.

Many telecommunications applications require the capability to switch any signal in an input array of N signals to one output signal in an array of N output signals. Telecommunications switching, transport and routing systems make widespread use of networks called multistage interconnection networks (MIN), to accomplish this function. These are alternating layers of fixed interconnection patterns and arrays of basic switching modules for two signals, called bypass-exchange switches. The bypass-exchange switch is an elementary switch for two signals that may either pass the two input signals unaffected or interchange them. Each layer of interconnection links and switch arrays is defined as a stage. MINs are capable of performing dynamic interconnections between a source point and a target point, by varying the settings of the switches. An example of a MIN network is the Omega network.

MINs have been proposed and utilized for computer architecture and telephone switch gear where the signals are electronic. The one dimensional network has a planar configuration (two dimensions) that suits electronic signals, Optics, however, can propagate in free space, thus easily allowing for a more efficient three dimensional topology. Planes of switching elements are interconnected by optical beams, exploiting the spatial bandwidth available in the optical domain. The switching element in this case will have four signals at the input and the output.

Traditional approaches to designing the elementary bypass-exchange switch for optical signals, include building a hybrid opto-electronic semiconductor circuit employing photodetectors, electronic circuitry for switching and lasers or optical modulators. Optical signals are converted to electric signals, which after amplification and electronic switching, are used to drive the lasers. The disadvantages of this process include low efficiency and reduced signal to noise ratios due to noise factors introduced and confinement to sub-gigabit modulation rates.

An alternative approach is an all optical switch which performs the switching function without converting the signals from the optical domain to the electrical domain and back. One option is to use polarization based switching that first combines two signals when they are polarized linearly and perpendicularly to each other. The switching itself is done by exchanging polarization states of the two signals. Combining and splitting the two perpendicularly polarized signals has been demonstrated with polarized beam splitters and also recently demonstrated with a birefringent computer generated hologram. Disadvantages of this approach are the bulkiness of the required optical devices and the difficulty of size reducing a system constructed in this fashion.

SUMMARY OF THE INVENTION

The present invention overcomes the disadvantages and limitations of the prior art by providing a compact, all optical switch that utilizes a double refracting crystal that acts as a polarizing beam displacer in conjunction with a controllable half wave gate that is able to rotate the polarization of an incident light beam by 90 degrees in accordance with a control input.

A main advantage of systems constructed in accordance with the present invention is that they eliminate the need to convert optical signals to the electrical domain and back, they are compact, thus, eliminating the relatively large volume required for conventional beam splitter designs, they require no alignment, eliminating the alignment problems associated with conventional designs and the signals propagate through them in a straight path.

Hence, there is provided according to the teachings of the present invention, an optical switch for switching first and second input beams linearly polarized in the same direction, comprising a first half wave plate optically coupled to the second input beam, the first half wave plate for rotating the polarization of light incident thereto 90 degrees, a first polarizing beam displacer optically coupled to the first input beam and the output of the first half wave plate, the first polarizing beam displacer for refracting the first input beam and the output of the first half wave plate to produce a combined beam, the first input beam and the output of the first polarizing beam displacer displaced from each other a predetermined distance, a controllable half wave gate having a gate input port, a gate output port, a control input, a passive state and an active state, the controllable half wave gate in the passive state passing the combined beam incident to the gate input port through to the gate output port whereby the polarization of the combined beam is unchanged, the controllable half wave gate in the active state passing the combined beam incident through to the gate input port through to the gate output port whereby the polarization of the combined beam is rotated 90 degrees, a control signal present at the control input causing the controllable half wave gate to switch between the passive and the active states, a second polarization beam displacer optically coupled to the gate output port, the second polarization beam displacer for refracting light incident thereto into first and second refracted output beams displaced from each other a predetermined distance upon exiting the second polarization beam displacer and a second half wave plate optically coupled to the second refracted output beam, the second half wave plate for rotating the polarization of light incident thereto 90 degrees.

While the invention has been described with respect to a limited number of embodiments, it will be appreciated that many variations, modifications and other applications of the invention may be made.

BRIEF DESCRIPTION OF THE DRAWINGS

The invention is herein described, by way of example only, with reference to the accompanying drawings, wherein:

FIG. 6 is a detailed view of a preferred embodiment of the present invention illustrating a full 4×4 all optical switch.

DESCRIPTION OF THE PREFERRED EMBODIMENT

The present invention is of an all optical multistage switch which utilizes polarizing beam displacers in conjunction with a controllable half wave gate and half wave plate to perform optical signal switching.

The principles and operation of the present invention may be better understood with reference to the drawings and the accompanying description.

Figure 1:
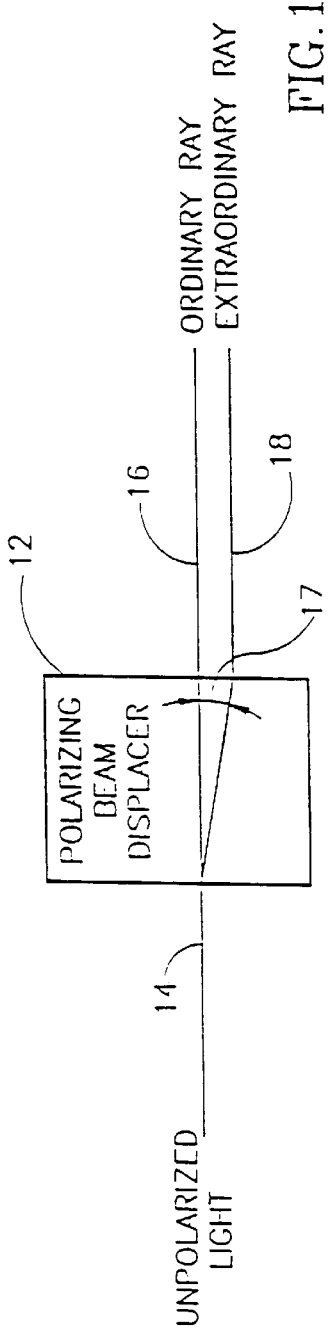
FIG. 1 is a diagram of a polarizing beam displacer used in a preferred embodiment of the present invention.

The present invention discloses a bypass-exchange switch 10 and a reduced 4×4 switch 50 and a full 4×4 switch 60. Switches 10, 50, 60 are all based on a polarizing beam displacement device 12. Optical implementation of the polarization based bypass-exchange switch 10 includes combining two optical input signals when they are linearly polarized and perpendicular with respect to each other. Polarizing beam displacement device 12 is implemented as a calcite crystal. Calcite, which chemically is calcium carbonate ($CaCO_3$), occurs in nature in a great variety of crystal forms and is transparent to visible light. As shown in FIG. 1, when a beam of ordinary unpolarized light 14 is incident on calcite crystal 12, there will be two refracted beams 16, 18, hence double refraction. The ray for which Snell's law is obeyed is ordinary ray 16. The ray for which Snell's law is not obeyed is extraordinary ray 18. When the faces of calcite crystal 12 are parallel, the two refracted rays 16, 18 emerge parallel to incident beam 14 and displaced from each other. If incident light beam 14 is normal to the surface, extraordinary ray 18 will be refracted at an angle 17 of 6 degrees and will emerge parallel to, but displaced from, incident beam 14. Ordinary ray 16 will pass straight through without deviation. A rotation of crystal 12 about ordinary ray 16 will cause extraordinary ray 18 to rotate around fixed ordinary ran 16.

Figure 2:
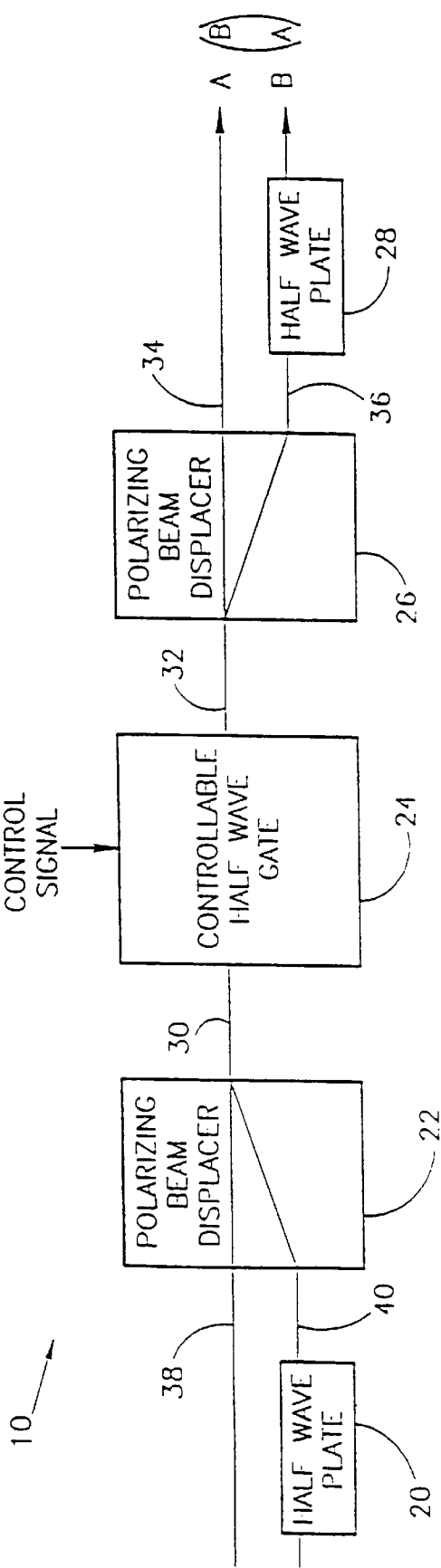
FIG. 2 is a block diagram of a preferred embodiment of the present invention illustrating an all optical bypass-exchange switch.

In a preferred embodiment, optical bypass-exchange switch 10, shown in FIG. 2, is implemented with two calcite polarizing beam displacers 22, 26. Polarizing beam displacers 22, 26 combine and split two input light beams A and B. In addition, two half wave plates 20, 28 are used for orienting polarization states in the input and output beams. Also, a controllable half wave gate 24 is utilized to perform the switching function.

Two input signals, A and B, must be linearly polarized in the same direction before being input to bypass-exchange switch 10. Input B propagates through a fixed half wave plate 20 and is converted to a linearly polarized beam 40 rotated 90 degrees. Both signals are incident on calcite crystal polarizing beam displacer 22. The length of crystal 22 provides a displacement that equals the distance between inputs A and B, guarantying that both signals emerge as one ray 30 with two orthogonal polarizations representing signals A and B. Signal 30 then passes through a controllable half wave gate 24. Controllable half wave gate 24 has an active state and a passive state, determined by a control signal. If controllable half wave gate 24 is active, the two orthogonal polarizations will undergo 90 degree rotation, with signals A and B exchanging their polarization states. If controllable half wave gate 24 is passive, the two orthogonal polarizations will not undergo 90 degree rotation. A resultant signal 32 is then split by polarizing beam displacer 26 into signals 34, 36. Polarization of signal 36 is then converted back to its original polarization state for consistency with the input polarization state after passing through half wave plate 28, since bypass-exchange switch 10 may be employed in a multistage switch. Bypass-exchange switch 10 was built and constructed using a smectic, surface stabilized ferroelectric liquid crystal (SSFLC) cell, manufactured by Fabia Technologies for controllable half wave gate 24. The cell consists of two glass plates covered with transparent electrodes and placed with a small gap, where the smectic liquid crystal lies. Alternatives for ferroelectric liquid crystal cell include a nematic liquid crystal shutter or a liquid crystal light valve. The transmitted light through the cell is given by:

$$T=\sin^2(4\theta)\sin^2(\Delta\pi n(\lambda)d/\lambda)$$

When $\Delta nd$ equals $\lambda/2$. the cell acts as a half-wave switchable plate ($\Delta n$ is the birefringence of the ferroelectric liquid crystal material, d is the width of the ferroelectric liquid crystal layer). For best performance, the tilt angle $\theta$ of smectic phase is required to be close to 22.5 degrees.

To fully utilize the imaging capabilities of optical elements, it is beneficial to extend one dimensional networks to two dimensions. The network configuration will then change from planar to volumetric. The source plane is connected to the destination plane via cascaded stages of switching planes and two dimensional interconnection patterns. The switching element has four inputs and four outputs. One embodiment is a reduced state 4×4 switch having 16 switching states and another embodiment is a full 4×4 switch having 24 switching states. The reduced state switch includes four elementary bypass-exchange switches 10, as shown in FIG. 2.

Figure 3:
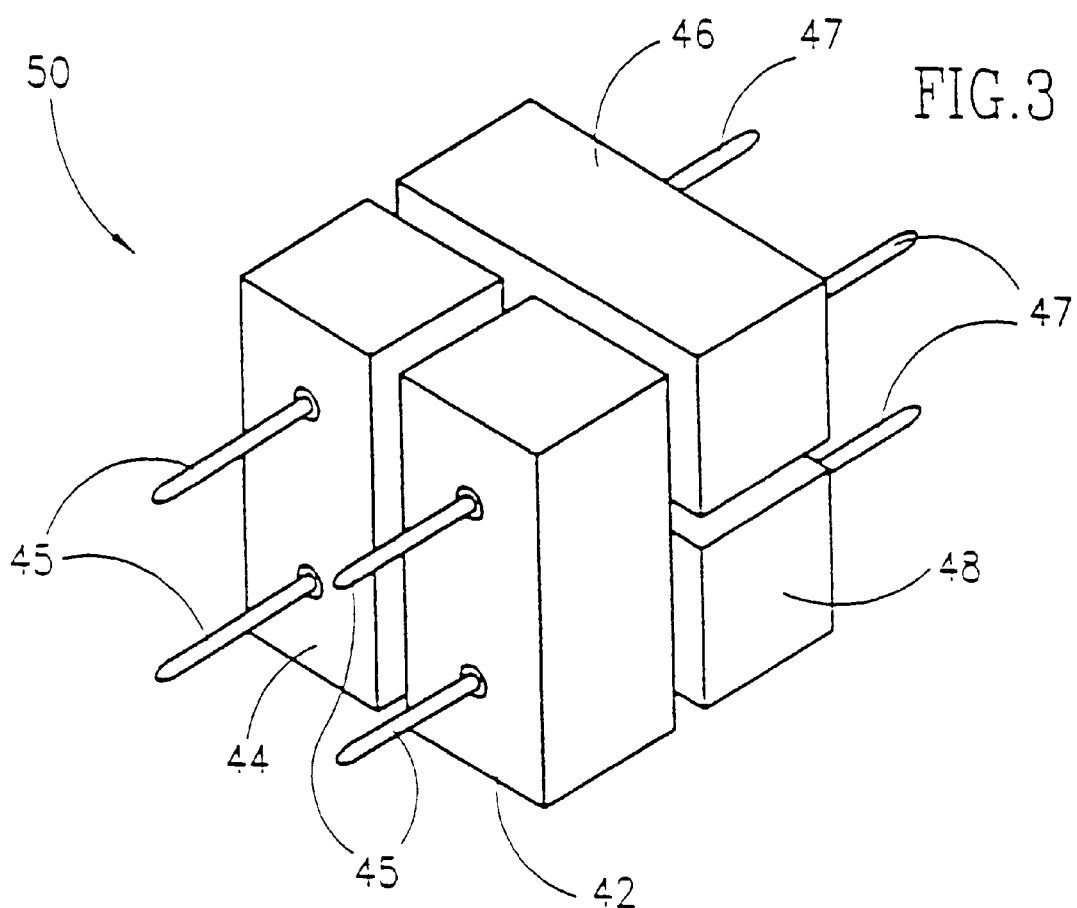
FIG. 3 is a perspective view of a preferred embodiment of the present invention illustrating a reduced state 4×4 all optical switch.

In a preferred embodiment, reduced state 4×4 switch 50 includes four bypass-exchange switches organized as two vertical 2×2 bypass-exchanges switches 42, 44 and two horizontal 2×2 horizontal bypass-exchange switches 46, 48, as shown in FIG. 3. Switch 50 is a reduced state 4×4 switch because it can switch four input signals 45 in only 16 distinct ways (i.e. $2^4$). The input and output signals are arranged in a 2×2 matrix form and are all linearly polarized with the same orientation.

Figure 4:
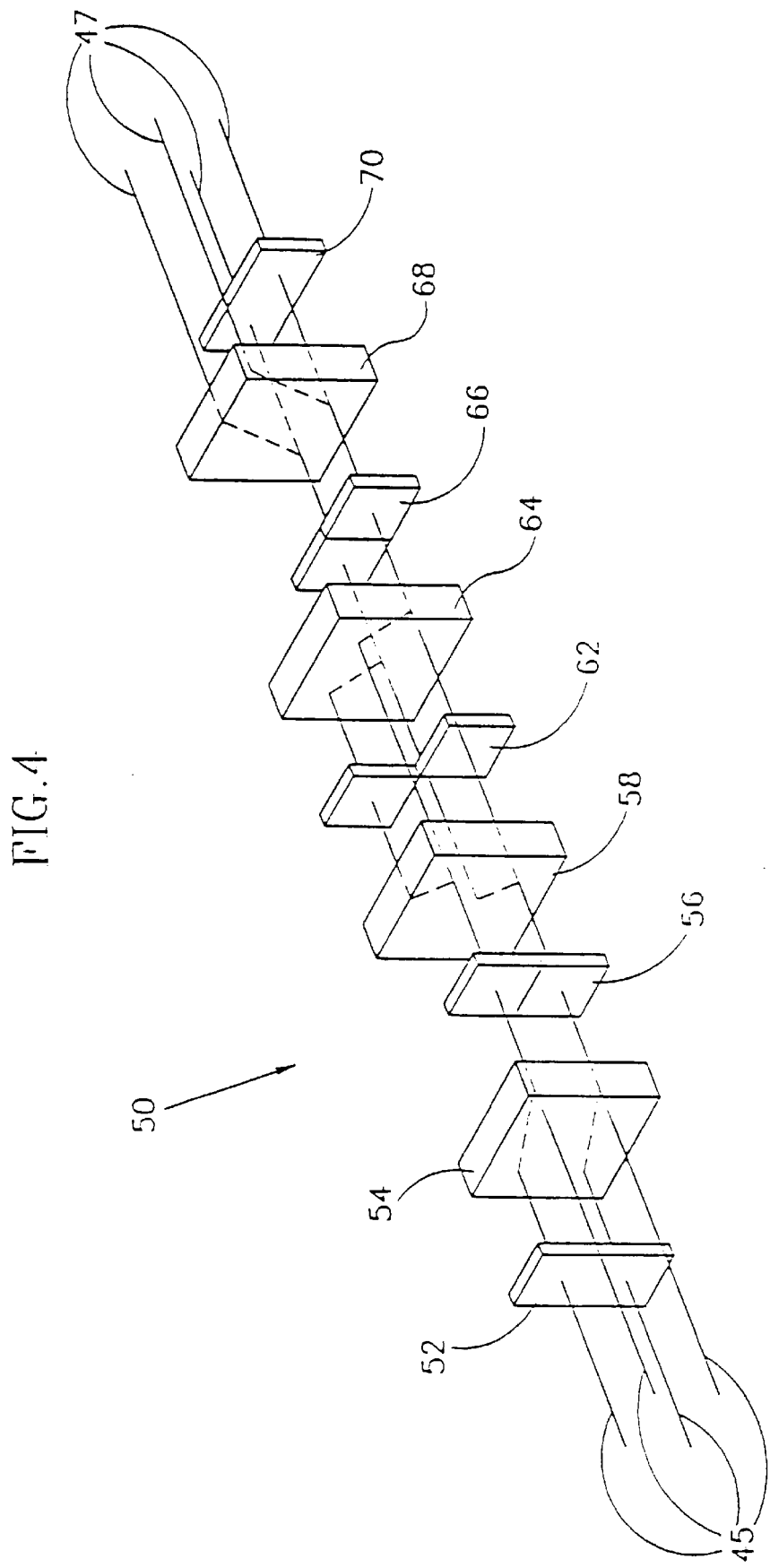
FIG. 4 is a detailed view of a preferred embodiment of the present invention illustrating a reduced state 4×4 all optical switch.

The optical setup for reduced state 4×4 switch 50 is shown is more detail in FIG. 4. Two of the optical input signals 45 pass through half wave plate 52. All four signals then pass through polarizing beam displacer 54. The combined signal output then passes through controllable half wave gate 56, which by a control signal will be either in the active or passive state. If gate 56 is active the two orthogonal polarizations will undergo a 90 degree rotation, with the signals exchanging their polarization states. If gate 56 is passive the two orthogonal polarizations will not undergo a 90 degree rotation. The beams are then split by polarizing beam displacer 58. The two diagonal signal's polarizations are rotated once more by half wave plate 62, for proper polarization direction for the next stage of switches, Half wave plate 62 is the result of combining two half wave plates that overlap in one of the beam paths. Two 90 degree rotations of a light beam returns the linear polarization of the emerging beam back to it original state, thus eliminating the need for two half wave plates, one followed by the other, in the path of that particular beam. Another polarizing beam displacer 64 combines the signals, controllable half wave gate 66 performs the switching, and another polarizing beam displacer 68 splits the two signals back into four. Half wave plate 70 restores the polarization of the lower pair of signals. The output polarization state is returned to its original orientation for consistency with the input polarization state, as the switch is likely to be employed in a multistage system. Four output signals 47 are output from switch 50.

Figure 5:
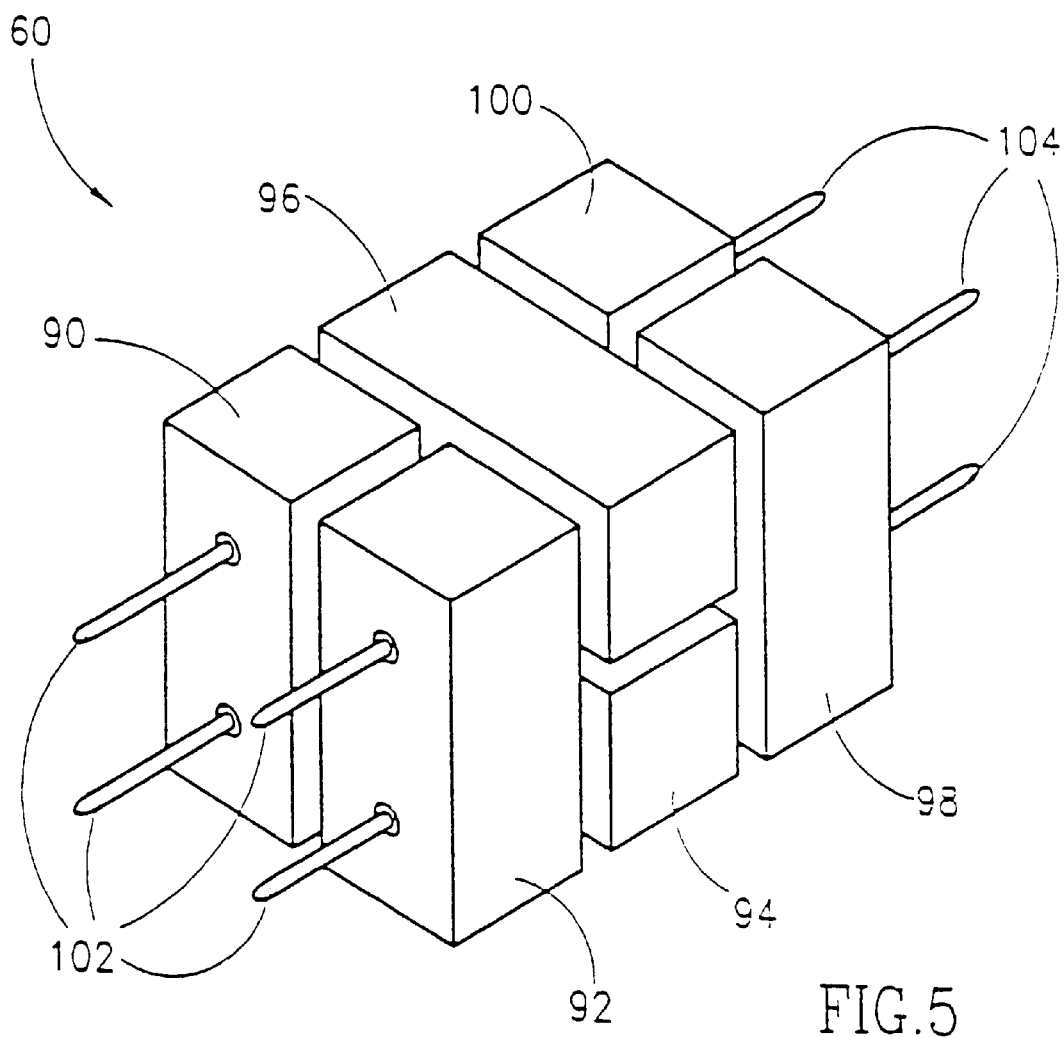
FIG. 5 is a perspective view of a preferred embodiment of the present invention illustrating a full 4×4 all optical switch.

In a preferred embodiment, two dimensional full 4×4 switch 60, shown in FIG. 5, having 24 switching states (i.e. 4!) is disclosed. Switch 60 includes two vertical 2×2 bypass-exchange switches 90, 92, two horizontal 2×2 bypass-exchange switches 94, 96 followed by two vertical 2×2 bypass-exchange switches 98, 100. Four light beams 102, having similarly oriented linear polarizations, are input to switch 60 and four beams 104 are output.

A detailed illustration of switch 60 is shown in FIG. 6. The left half of input beams 102 pass through half wave plate 110. Polarizing beam displacer 112 combines all four beams, controllable half wave gate 114 performs the switching function, in accordance with a control input signal, and polarizing beam displacer 116 splits the two beams back into four separate beams. Half wave plate 118 rotates the linear polarization of two of the signal beams and polarizing beam displacer 120 combines the four beams into two. Controllable half wave gate 122 switches the two beams, in accordance with a control signal input, followed by polarizing beam displacer 124 which splits them back into four beams. Half wave plate 72 rotates the polarization of two of the beams followed by polarizing beam displacer 74 which combines the four beams into two. Controllable half wave gate 76 switches the two beams followed by polarizing beam displacer 78 which splits the two beams back into four. Half wave plate 80 restores the original polarization of two of the beams. Output signal beams 104 are output by switch 60.

While the invention has been described with respect to a limited number of embodiments, it will be appreciated that many variations, modifications and other applications of the invention may be made.

What is claimed is:

1. An optical switch for switching first and second input beams linearly polarized in the same direction, comprising:

a first half wave plate optically coupled to the second input beam, said first half wave plate for rotating the polarization of light incident thereto 90 degrees:

a first polarizing beam displacer optically coupled to the first input beam and the output of said first half wave plate, said first polarizing beam displacer for refracting the first input beam and the output of said first half wave plate to produce a combined beam, the first input beam and the output of said first half wave plate incident to said first polarizing beam displacer displaced from each other a predetermined distance;

a controllable half wave gate having a gate input port, a gate output port, a control input, a passive state and an active state, said controllable half wave gate in said passive state passing said combined beam incident to said gate input port through to said gate output port whereby the polarization of said combined beam is unchanged, said controllable half wave gate in said active state passing said combined beam incident through to said gate input port through to said gate output port whereby the polarization of said combined beam is rotated 90 degrees, a control signal present at said control input causing said controllable half wave gate to switch between said passive and said active states, said gate including a ferroelectric liquid crystal shutter, a second polarization beam displacer optically coupled to said gate output port, said second polarization beam displacer for refracting light incident thereto into first and second refracted output beams displaced from each other a predetermined distance upon exiting said second polarization beam displacer; and a second half wave plate optically coupled to said second refracted out beam, said second refracted output beam, said second half wave plate for rotating the polarization of light incident thereto 90 degrees.

2. The optical switch as claimed in claim 1, wherein said first and second polarizing beam displacers include a double refracting calcite crystal.

3. An optical switch for switching first and second input beams linearly polarized in the same direction, comprising;

a first half wave plate optically coupled to the second input beam, said first half wave plate for rotating the polarization of light incident thereto 90 degrees:

a first polarizing beam displace optically coupled to the first input beam and the output of said first wave plate, said first polarizing beam displacer for refracting the first input beam and the output of said first half wave plate to produce a combined beam, the first input beam and the output of said first half wave plate incident to said first polarizing beam displacer displaced from each other a predetermined distance;

a controllable half wave gate having a gate input port, a gate output port, a control input, a passive state and an active state, said controllable half wave gate in said passive state passing said combined beam incident to said gate input port through to said sate output port whereby the polarization of said combined beam is unchanged, said controllable half wave gate in said active state passing said combined beam incident through to said gate input port through to said gate output port whereby the polarization of said combined beam is rotated 90 degrees, a control signal present at said control input causing said controllable half wave gate to switch between said passive and said active states, said gate including a liquid crystal light valve;

a second polarization beam displacer optically coupled to said gate output port, said second polarizing beam displacer for refracting light incident thereto into first and second refracted output beams displaced from each other a predetermined distance upon exiting said second polarization beam displacer; and a second half wave plate optically coupled to said second refracted output beam, said second refracted output beam, said second half wave plate for rotating the polarization of light incident thereto 90 degrees.

4. An optical switch for switching first, second, third and forth input beams linearly polarized in the same direction, comprising:

a first, second, third and forth bypass-exchange switch, each including:

a first and second input port;

a first half wave plate optically coupled to said second input port, said first half wave plate for rotating the polarization of light incident thereto 90 degrees;

a first polarizing beam displacer optically coupled to said first input port and the output of said first half wave plate, said first polarizing beam displacer for refracting light received through said first input port and the output of said first half wave plate into a combined beam, light received through said input port and the output beam of said first half wave plate incident to said first polarizing beam displacer displaced from each other a predetermined distance;

a controllable half wave gate having a gate input port, a gate output port, a control input, a passive state and an active state, said controllable half wave gate in said passive state passing said combined beam incident through to said gate input port whereby the polarization of said combined beam is unchanged, said controllable half wave gate in said active state passing said combined beam incident through to said gate input port to said gate output port whereby the polarization of said combined beam is rotated 90 degrees, a control signal present at said control input causing said controllable half wave gate to switch between said passive and active states;

a second polarization beam displacer optically coupled to said gate output port, said second polarization beam displacer for refracting light incident thereto into first and second refracted output beams displaced from each other a predetermined distance upon exiting said second polarization beam displacer;

a second half wave plate optically coupled to said second refracted output beam, said second half wave plate for rotating the polarization of light incident thereto 90 degreesl; and first and second output ports, said first output port optically coupled to said first refracted output beam, said second output port optically coupled to the output of said second half wave plate;

said first and second input port of said first bypass-exchange switch optically coupled to the first and second input beam, respectively;

said first and second input port of said second bypass-exchange switch optically coupled to the third and forth input beam, respectively;

said first and second output port of said first bypass-exchange switch optically coupled to said first input port of said third bypass-exchange switch and said first input port of said forth bypass-exchange switch, respectively;

said first and second output port of said second bypass-exchange switch optically coupled to said second input port of said third bypass-exchange switch and said second input port of said forth bypass-exchange switch, respectively;

said first and second output ports of said third and forth bypass-exchange switches constituting the output of the optical switch; and first, second, third and forth control signals coupled to said control inputs of said first, second, third and forth bypass-exchange switches, respectively, said first, second, third and forth control signals causing each of said first, second, third and forth bypass-exchange switches to switch between said passive and said active states.

5. The optical switch as claimed in claim 4, wherein said first and second polarizing beam displacers include a double refracting calcite crystal.

6. The optical switch as claimed in claim 4, wherein said controllable half wave gate includes a ferroelectric liquid crystal shutter.

7. The optical switch as claimed in claim 4, wherein said controllable half wave gate includes a liquid crystal light valve.

8. The optical switch as claimed in claim 4, wherein said controllable half wave gate includes a nematic liquid crystal shutter.

9. An optical switch for switching first, second, third and forth input beams linearly polarized in the same direction, comprising:

first, second, third, forth, fifth and sixth bypass-exchange switches, each including:
- a first and second input port;
- a first half wave plate optically coupled to said second input port, said first half wave plate for rotating the polarization of light incident thereto 90 degrees;
- a first polarizing beam displacer optically coupled to said first input port and the output of said first half wave plate, said first polarizing beam displacer for refracting light received through said first input port and the output of said first half wave plate into a combined beam, light received through said input port and the output beam of said first half wave plate incident to said first polarizing beam displacer displaced from each other a predetermined distance;
- a controllable half wave gate having a gate input port, a gate output port, a control input, a passive state and an active state, said controllable half wave gate in said passive state passing said combined beam incident through to said gate input port whereby the polarization of said combined beam is unchanged, said controllable half wave gate in said active state passing said combined beam incident to said gate input port through to said gate output port whereby the polarization of said combined beam is rotated 90 degrees, a control signal present at said control input causing said controllable half wave gate to switch between said passive and said active states;
- a second polarization beam displacer optically coupled to said gate output port, said second polarization beam displacer for refracting light incident thereto into first and second refracted output beams displaced from each other a predetermined distance upon exiting said second polarization beam displacer;
- a second half wave plate optically coupled to said second refracted output beam, said second half wave plate for rotating the polarization of light incident thereto 90 degrees: and
- first and second output ports, said first output port optically coupled to said first refracted output beam, said second output port optically coupled to the output of said second half wave plate;

said first and second input port of said first bypass-exchange switch optically coupled to the first and second input beam, respectively;

said first and second input port of said second bypass-exchange switch optically coupled to the third and forth input beam, respectively;

said first and second output port of said first bypass-exchange switch optically coupled to said first input port of said third bypass-exchange switch and said first input port of said forth bypass-exchange switch, respectively;

said first and second output port of said second bypass-exchange switch optically coupled to said second input port of said third bypass-exchange switch and said second input port of said forth bypass-exchange switch, respectively;

said first and second output port of said third bypass-exchange switch optically coupled to said first input port of said fifth bypass-exchange switch and said first input port of said sixth bypass-exchange switch, respectively;

said first and second output port of said forth bypass-exchange switch optically coupled to said second input port of said fifth bypass-exchange switch and said second input port of said sixth bypass-exchange switch, respectively;

said first and second output ports of said fifth and sixth bypass-exchange switches constituting the output of the optical switch; and first, second, third, forth, fifth and sixth control signals coupled to said control inputs of said first, second, third, forth, fifth and sixth bypass-exchange switches, respectively, said first, second, third, forth, fifth and sixth control signals causing each of said first, second, third, forth, fifth and sixth bypass-exchange switches to switch between said passive state and said active states.

10. The optical switch as claimed in claim 9, wherein said first and second polarizing beam displacers include a double refracting calcite crystal.

11. The optical switch as claimed in claim 9, wherein said controllable half wave gate includes a ferroelectric liquid crystal shutter.

12. The optical switch as claimed in claim 9, wherein said controllable half wave gate includes a liquid crystal light valve.

13. The optical switch as claimed in claim 9, wherein said controllable half wave gate includes a nematic liquid crystal shutter.

* * * * *